US011106716B2

(12) United States Patent
Bhowan et al.

(10) Patent No.: US 11,106,716 B2
(45) Date of Patent: Aug. 31, 2021

(54) AUTOMATIC HIERARCHICAL CLASSIFICATION AND METADATA IDENTIFICATION OF DOCUMENT USING MACHINE LEARNING AND FUZZY MATCHING

(71) Applicants: Accenture Global Solutions Limited, Dublin (IE); Urvesh Bhowan, Dublin (IE); Pedro Sacristan, Dublin (IE); Laura O'Malley, Dublin (IE); Abhilash Alexander Miranda, Dublin (IE); Medb Corcoran, Dublin (IE)

(72) Inventors: Urvesh Bhowan, Dublin (IE); Pedro Sacristan, Dublin (IE); Laura O'Malley, Dublin (IE); Abhilash Alexander Miranda, Dublin (IE); Medb Corcoran, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 509 days.

(21) Appl. No.: 15/810,885

(22) Filed: Nov. 13, 2017

(65) Prior Publication Data

US 2019/0147103 A1     May 16, 2019

(51) Int. Cl.
*G06F 16/00* (2019.01)
*G06F 16/30* (2019.01)
(Continued)

(52) U.S. Cl.
CPC ........ *G06F 16/353* (2019.01); *G06F 16/2468* (2019.01); *G06F 16/93* (2019.01);
(Continued)

(58) Field of Classification Search
CPC .... G06F 16/353; G06F 16/2468; G06F 16/93; G06K 9/00456
See application file for complete search history.

(56) References Cited

U.S. PATENT DOCUMENTS

2010/0202698 A1    8/2010  Schmidtler et al.
2010/0223276 A1*   9/2010  Al-Shameri ......... G06K 9/0063
                                                              707/769
(Continued)

FOREIGN PATENT DOCUMENTS

EP        2811425 A2    12/2014
JP       2000-112993      4/2000
(Continued)

OTHER PUBLICATIONS

Kamath C. (2001) On Mining Scientific Datasets. In: Grossman R.L., Kamath C., Kegelmeyer P. Kumar V., Namburu R.R. (eds) Data Mining for Scientific and Engineering Applications. Massive Computing, vol. 2. Springer, Boston, MA (Year: 2001).*

(Continued)

*Primary Examiner* — Tony Mahmoudi
*Assistant Examiner* — Thai V Dang
(74) *Attorney, Agent, or Firm* — Crowell & Moring LLP

(57) ABSTRACT

A hierarchical document classification system is disclosed. The system includes a text-based document classifier model for classifying an input electronic document into one of a set of predefined document categories. The system further includes an image-based metadata identification model for classifying electronic documents of a particular document category into a set of metadata categories. The system further includes a fuzzy text matcher for supplementing classification accuracy of the image-based metadata identification model to obtain a metadata category for the input electronic document.

20 Claims, 6 Drawing Sheets

(51) Int. Cl.
  *G06F 16/35* (2019.01)
  *G06K 9/00* (2006.01)
  *G06F 16/93* (2019.01)
  *G06F 16/2458* (2019.01)
  *G06N 5/02* (2006.01)
  *G06N 5/04* (2006.01)

(52) U.S. Cl.
  CPC ..... *G06K 9/00442* (2013.01); *G06K 9/00456* (2013.01); *G06N 5/022* (2013.01); *G06N 5/048* (2013.01); *G06K 2209/27* (2013.01)

(56) References Cited

U.S. PATENT DOCUMENTS

| | | | | |
|---|---|---|---|---|
| 2013/0182002 A1* | 7/2013 | Macciola | ........... | G06K 9/00463 345/589 |
| 2014/0337989 A1 | 11/2014 | Orsini et al. | | |
| 2016/0328610 A1* | 11/2016 | Thompson | ......... | G06K 9/00469 |
| 2017/0278015 A1 | 9/2017 | Miranda et al. | | |

FOREIGN PATENT DOCUMENTS

| | | |
|---|---|---|
| JP | 2008-176625 | 7/2008 |
| JP | 2012-517637 | 8/2012 |
| JP | 2015-503813 | 2/2015 |
| JP | 2016-071412 | 5/2016 |

OTHER PUBLICATIONS

Partial European Search Report in Europe Application No. 18199681.0, dated Apr. 11, 2019, 13 pages.

Extended European Search Report in Europe Application No. 18199681.0, dated Aug. 13, 2019, 16 pages.

Bieniecki et al., "Image Preprocessing for Improving OCR Accuracy," Perspective Technologies and Methods in Mems Design, 2007, Memstech 2007. International Conference on, IEEE, PI, dated May 1, 2007, XP031122877, 6 pages.

Decision to Grant Patent from the Japanese Patent Office dated Nov. 26, 2019 for Application No. 2018-197523 (6 pp.).

* cited by examiner

AUTOMATIC HIERARCHICAL CLASSIFICATION AND METADATA IDENTIFICATION OF DOCUMENT USING MACHINE LEARNING AND FUZZY MATCHING

TECHNICAL FIELD

This disclosure is related to hierarchical classification of documents and recognition/identification of metadata and attributes for the documents.

BACKGROUND

Electronic documents may contain embedded texts and images. They may be created for various uses and generated in various electronic file format. Each page of electronic document files may further be associated with metadata and attributes that may or may not be directly embedded in the contents or headers of the electronic document files. Automated classification of electronic documents and recognition/identification of metadata and attributes associated with each page of the electronic documents may facilitate organization, archiving, and more efficient use of these electronic documents.

DETAILED DESCRIPTION

Figure 1:
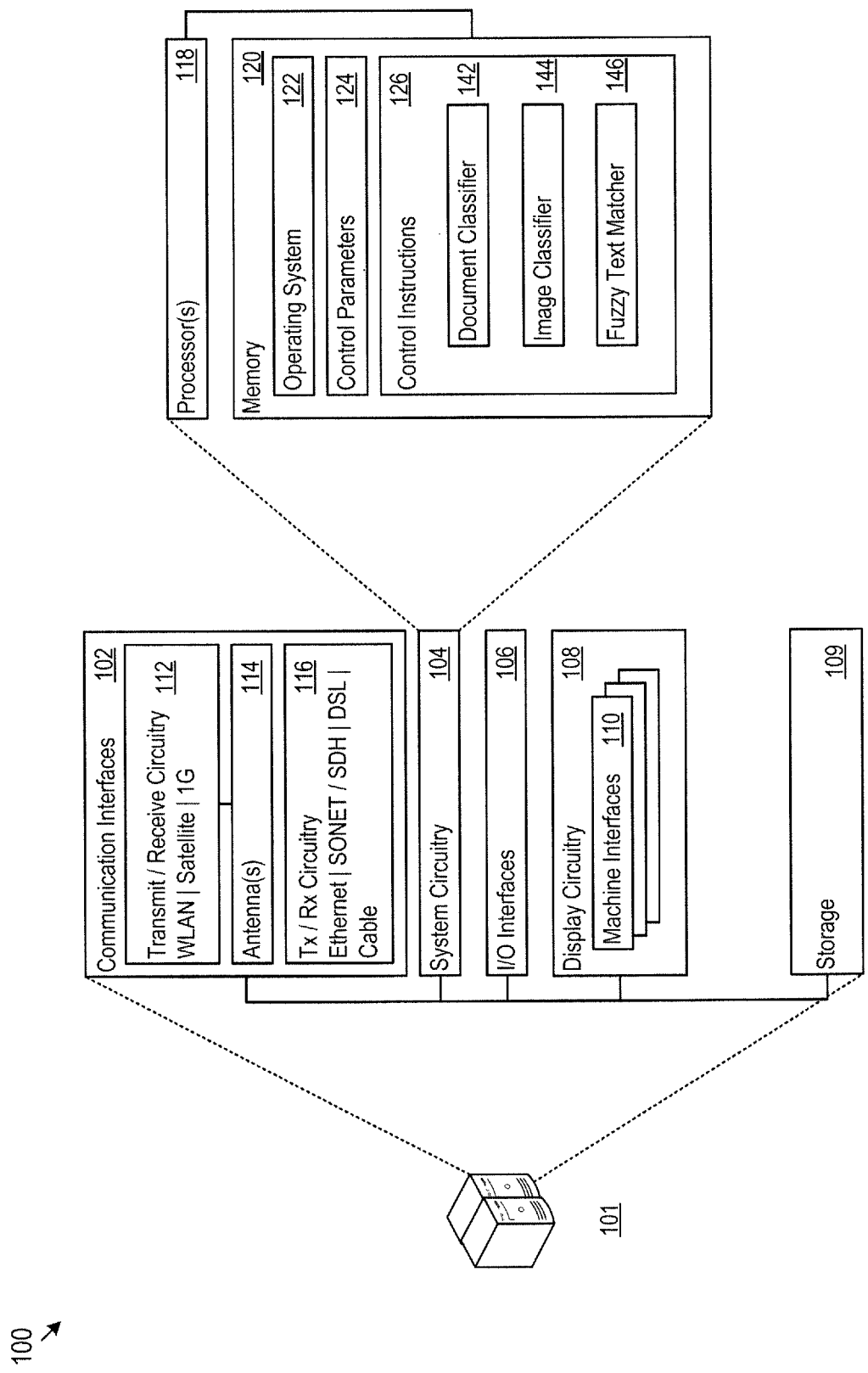
FIG. 1 shows an exemplary computer system for implementing a hierarchical classification and metadata recognition/identification of electronic documents.

Electronic documents may contain texts, images, and other components arranged into pages. Electronic documents may further be stored in various electronic file formats, including but not limited to file formats based on page description languages such as PostScript, PDF, and XML, and binary file formats such as Microsoft Word. A page description language, for example, may be used to specify various components in a document page including their contents and their positional and layout relationships. Textual information contained in a document page, in particular, may be embedded as plain text data components represented as strings of characters with font and positional/layout information or may be embedded as bitmap image components. In one example, an entire electronic document page may be a bitmap image carrying embedded textual information as well as other graphical and layout information. In particular, electronic documents obtained by optically scanning and digitizing paper sources may contain bitmap pages of images.

Electronic documents may originate from various sources and contain disparate contents. An electronic document in the form of, e.g., a document file may further include multiple pages each containing disparate contents. An automatic document recognition, identification, classification, and cataloging task may require identification of relevant pages from a large collection of electronic documents and extract metadata from each of the relevant pages. Such metadata recognition/identification may be achieved using content recognition/identification and/or classifier models developed based on machine learning technologies. Here, the term metadata may broadly refer to an attribute of the electronic document pages. This attribute may not be included in, e.g., headers of the corresponding electronic files. For example, a collection of electronic documents may contain pages of vendor invoices among many other information. In such cases, metadata may refer to vendor names or IDs associated with the invoices contained in the collection of electronic documents. Such metadata of electronic document pages may belong to a predefined set of metadata categories, e.g., a set of vendor names/IDs. The metadata information may be embedded in texts, graphics, or layouts of the electronic documents. Recognition/Identification of such metadata may help better extract information of interest, label, and organize the electronic documents. While the term "electronic document" may be normally used to refer to an electronic file that may contain multiple pages, it will be used, in the disclosure below, synonymously to the term "page" for simplicity of description. As such, each page of a collection of document pages may be referred to as an electronic document and a collection of documents may refer to pages parsed and extracted from electronic document files and other sources.

Electronic documents (or pages) that are of a particular category of interest (e.g., vendor invoices) and need metadata recognition/identification may only be a small percentage of a large collection of electronic documents. Models based on machine learning algorithms for providing direct metadata recognition/identification among the large collection of electronic documents may require large number document features, a massive search space to achieve decent metadata recognition/identification accuracy. Development and updating of such models thus may consume excessive amount of computational resources. The resulting models may nevertheless be inaccurate due to noises from document pages that are unrelated to, e.g., vendor invoices. In addition, metadata information may be embedded in textual information or in graphical and layout information in an electronic document and thus a single model based on only text recognition/identification technologies or only image recognition/identification technologies may not suffice to provide an overall satisfactory metadata recognition/identification accuracy.

The disclosure below provides a multi-stage hierarchical approach to the problem of metadata recognition/identification for improving accuracy, and at the same time, for reducing computational requirements during model development, model update, and feature computation for an input electronic document. In one exemplary implementation, the multi-stage metadata recognition/identification approach includes multiple (e.g., three) hierarchical stages involving, for example, a text-based document classification and filtering stage, an image-based metadata recognition/identification stage, and a supplemental fuzzy text matching stage for further improving the accuracy of the metadata recognition/identification. The models for the text-based document classification and the image-based metadata recognition/identification may be respectively based on any suitable machine learning algorithms for text classification and image classification. The term "metadata identification" and the term "metadata recognition" are used synonymously and may refer to both recognition/identification of textual metadata information embedded in an input electronic document (e.g., vendor name) and graphical/layout metadata patterns in the input electronic document that are characteristic of a particular type of document (e.g., vendor invoice) associated with some particular metadata (e.g., a particular vendor).

In one implementation, the text-based document classifier model may be used to classify input electronic documents into a predefined set of document categories, including, e.g., vendor invoice and other vendor document categories. Electronic documents classified into categories among the predefined set of document categories but not of interest may be filtered. As such, only the documents belonging to categories of interest need to be processed by the metadata identification model in the next stage of the hierarchical approach to extract metadata information. Because only a smaller set of electronic documents (e.g., vendor invoices) among the input electronic documents need to be further analyzed, the development of the metadata identification model based on machine learning technologies may rely on more targeted and narrower range of training and testing corpus and rely on better-defined machine learning features, providing an image-based metadata identification model that is of higher accuracy and is less computationally taxing. In one implementation, the metadata identification model may be based on image recognition and classification technologies because characteristic metadata features may often be embedded in layout and graphical components in an input electronic document. For example, a particular vendor (with a unique vendor name or ID) may use an invoice format containing layout or graphical features that are unique to this vendor. While textual content in an electronic document may also contain entity name and ID information, identification of metadata via text recognition may not be so accurate because entity name and ID information in an input electronic document may often be related to entities other than the one authoring the electronic document and issuing an invoice contained in the electronic document.

In some cases, an input electronic document may identified as belonging to a particular metadata category (e.g., a particular vendor name/ID) by the image-based metadata identification model but with a low identification confidence score. This, for example, may occur when the input electronic document belongs to a vendor whose invoice was not available for inclusion in the training data corpus when the image-based metadata identification model was established. In these situations, the supplemental fuzzy text matcher of the hierarchical approach based on performing comparison between features of texts in the input electronic documents and metadata items in an independent metadata database may help improve the accuracy of the image-based metadata identification model. The fuzzy text matcher may either confirm the metadata identification made by the image-based metadata identification model, or by proposing a different but more probable metadata category for the input electronic document. The metadata database relied on by the fuzzy text matcher may contain a more extensive set of metadata covering metadata categories, e.g., vendor names and IDs, that may have no correspondence in the training data set (e.g., vendor invoices) for establishing the image-based metadata identification model.

In FIG. 1, a system 100 for metadata identification of input electronic documents is shown as implemented by computers 101. Computers 101 may include communication interfaces 102, system circuitry 104, input/output (I/O) interfaces 106, storage 109, and display circuitry 108 that generates machine interfaces 110 locally or for remote display, e.g., in a web browser running on a local or remote machine. The machine interfaces 110 and the I/O interfaces 106 may include GUIs, touch sensitive displays, voice or facial recognition inputs, buttons, switches, speakers and other user interface elements. Additional examples of the I/O interfaces 106 include microphones, video and still image cameras, headset and microphone input/output jacks, Universal Serial Bus (USB) connectors, memory card slots, and other types of inputs. The I/O interfaces 106 may further include magnetic or optical media interfaces (e.g., a CDROM or DVD drive), serial and parallel bus interfaces, and keyboard and mouse interfaces.

The communication interfaces 102 may include wireless transmitters and receivers ("transceivers") 112 and any antennas 114 used by the transmitting and receiving circuitry of the transceivers 112. The transceivers 112 and antennas 114 may support Wi-Fi network communications, for instance, under any version of IEEE 802.11, e.g., 802.11n or 802.11ac. The communication interfaces 102 may also include wireline transceivers 116. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 109 may be used to store various initial, intermediate, or final data or model for building, updating, and operating the document classification, metadata identification, and fuzzy text matching models. The storage 109 may further store data corpus used for developing the document classification and metadata identification models. The storage 109 may further be used to implement the databased of metadata needed for the fussy text matching model. The storage 109 may be centralized or distributed. For example, it may be hosted remotely by a cloud computing service provider.

The system circuitry 104 may include hardware, software, firmware, or other circuitry in any combination. The system circuitry 104 may be implemented, for example, with one or more systems on a chip (SoC), application specific integrated circuits (ASIC), microprocessors, discrete analog and digital circuits, and other circuitry. The system circuitry 104 is part of the implementation of any desired functionality related to the building, maintenance, and application of the customized graph knowledge base. As just one example, the system circuitry 104 may include one or more instruction processors 118 and memories 120. The memories 120 stores, for example, control instructions 124 and an operating system 122. In one implementation, the instruction processors 118 executes the control instructions 124 and the operating system 122 to carry out any desired functionality related to the models for document classification, metadata identification, and fuzzy text matching.

Figure 2:
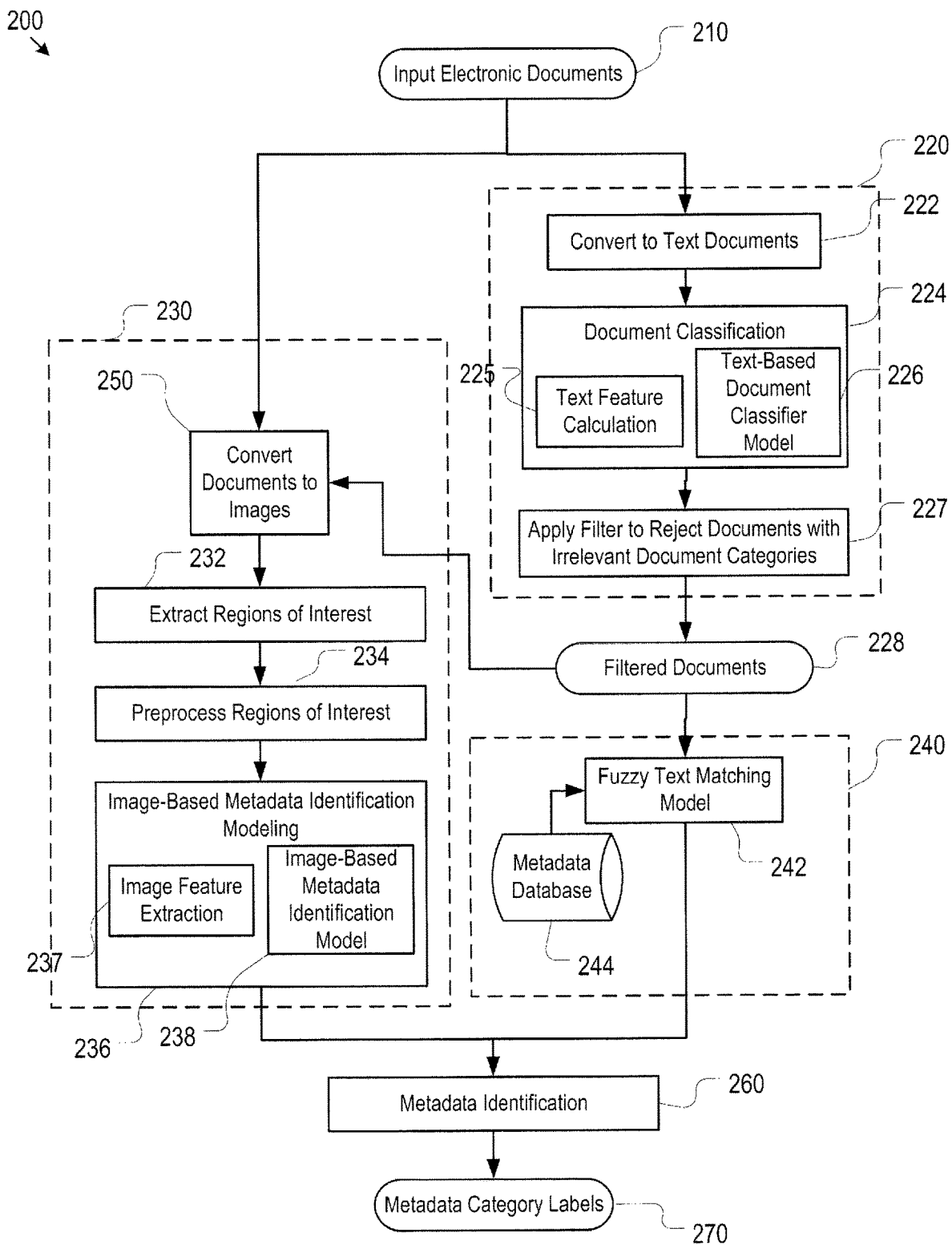
FIG. 2 illustrates a logic and data flow for an exemplary implementation of hierarchical classification and metadata identification of electronic documents.

FIG. 2 shows an exemplary logic and data flow 200 for hierarchical classification and metadata identification of electronic documents implemented in the computer system 100 of FIG. 1. The logic and data flow 200 includes logic and data flow for text-based document classification and filtering process 220, logic and data flow for image-based metadata identification process 230, and logic and data flow for fuzzy text matching process 240. The text-based document classification and filtering process 220, the image-based metadata identification process 230, and the fuzzy text matching process 240 are hierarchically related as shown by FIG. 2. Specifically, the filtered output documents 228 of the text-based document classification and filtering process 220 is input into the image-based metadata identification process 230 and the fuzzy text matching process 240.

For the text-based document classification and filtering process 220 of FIG. 2, the input electronic documents 210 are first converted to text documents (222). The input electronic documents may contain document pages from various sources. A multi-page electronic document file for example, may be separated into multiple documents each corresponding to one page. Conversion of the input electronic documents into text documents may be achieved via, e.g., Optical Character Recognition (OCR). As such, textual information contained in the input electronic documents may be extracted and converted into strings of characters. The converted text documents may be classified by a text-based document classifier model 226 (224). Specifically, text features of the converted text documents may be calculated using a predefined text feature calculation algorithm (225). The calculated text features may be input into the text-based document classifier model which classifies the converted text documents into one of a set of predefined document categories (226). The set of predefined document categories may include but are not limited to vendor invoices vendor proposals, produce catalogues, product manuals, warrantees, supply contracts, and the like In one implementation, the input electronic documents may be filtered to remove electronic documents that are not among of the document categories that are of interest (227). As such, only electronic documents that are of interest (228) are retained and further analyzed through the image-based metadata identification process 230 and the fuzzy text matching process 240. For example, vendor invoices may be the only document category that is of interest. As such, only electronic document classified as vendor invoices by the text-based document classification process 220 may be further analyzed for the identification of metadata.

For the image-based metadata identification process 230 of FIG. 2, images of the filtered documents 228 may first be obtained (250). Each image may correspond to one document (page). In one implementation, input documents 210 corresponding to some of the filtered electronic documents 228 may already be in image format and these electronic documents may not need to be converted to images. Some other input electronic documents 210 may be originally in formats other than images and thus after the filtering process in 220, they may be converted into images (250).

Each of the images of the input electronic documents belonging to the document categories that are of interest may then be processed to extract regions of interest (234). The region of interest for each image or document page may be a portion or part of the image with predefined size and location. For example, the region of interest may be the upper left quadrature of the image. The extraction of regions of interest help further reduce the amount of data that may need to be processed by the image-based identification process 230. The predetermination of the location and size of the regions of interest may be based on historical data. For example, the region of interest may be predefined as the upper left quadrature of the images if vendor invoice is the document category of interest and vendor invoices normally contain textual or graphical information embedding vendor metadata at the upper left quadratures. The image may be cropped and/or reshaped and/or realigned to obtain the region of interest.

To handle the situation that various vendors may place metadata carrying information in different parts of their invoices, multiple parallel processes of 230 of FIG. 2 may be run, each specifying different predefined size and location for regions of interest. Analysis outcome of the parallel metadata identification processes 230 may be combined to determine the metadata information of a document. For example, one of the parallel processes 230 may extract the upper left quadrature of the images and another one of the parallel processes 230 may extract the upper right quadrature of the images. As will be described below, the image-based metadata identification modeling 237 may be based on a regression algorithm (rather than a binary classifier) which outputs probabilities that an input region of interest being associated with each of a predefined set of metadata categories. In the situation where parallel image-based metadata identification processes 230 are being performed, the most probable metadata category for a particular input electronic document among metadata categories identified by the parallel metadata identification processes may be determined as the metadata category for that input electronic document.

In one implementation, the extracted regions of interest may be preprocessed (234) prior to the image-based metadata identification modeling 236. The region of interest may be resized and/or reshaped and/or re-aligned. The preprocessing of the regions of interest, for example, may include resolution reduction of the regions of interest. In particular, the number of imaging pixels of each region of interest may be reduced by aggregating and averaging a predetermined number of neighboring pixels together. For example, a region of interest having 200 by 200 imaging pixels may be reduced to 50 by 50 pixels. Such resolution reduction may help reducing the computational requirement for the image-based metadata identification process 230 without much information loss since metadata information embedded in the images corresponding to the input electronic documents may typically be identifiable at relatively low resolution. The preprocessing of the extract regions of interest may further include reshaping of the regions of interest. Such reshaping, for example, may be designed to detect and straighten skews in the regions of interest. Such skews may be introduced, for example, when the input electronic documents are generated using optical scanner to camera from original paper document sources. For example, vendor invoices may typically include tables having parallel lines. As such, lines that are not straight or not parallel may be detected in the regions of interest and may be corrected when preprocessing the regions of interest. The correction of skews, for example, may be achieved by determining a transformation matrix that may be applied to the pixelated data of the regions of interest.

The preprocessed regions of interest of the filtered electronic documents may then be analyzed by the image-based metadata identification modeling 236. Specifically, image features of the converted text documents may be extracted or learned using a predefined algorithm for image feature extraction (237). The extracted image features may be input into an image-based metadata identification model 238 which classifies the regions of interest into one of the predefined categories of metadata. The image-based metadata identification model may be based on, e.g., a regression algorithm, and may thus be designed to determine probabilities of a particular region of interest being associated with each of the predefined metadata categories. For example, the image-based metadata identification model may be designed to determine the probability of a region of interest from a particular image of an input electronic document of vendor invoice category being associated with each of a predefined group of vendor names or IDs. In one exemplary implementation, the image feature extraction 237 and image classifier model may be based on neural network methods such as convolutional neural networks.

The image-based metadata identification modeling 236 may fail to provide accurate metadata identification for some input regions of interest. For example, the probability of an input region of interest being associated with any particular predefined metadata category as determined by the image-based metadata identification modeling 236 may not stand out among other predefined metadata categories, indicating that the metadata identification process 236 is equivocal as to the designation of a metadata category for the image corresponding to this input region of interest. In one situation, images of metadata categories corresponding to some of the regions of interest of the input electronic documents processed by the image-based metadata identification modeling 236 may not be part of the training data corpus for the image-based metadata identification model 238. In other situations, a template image for a particular metadata category used in the training data corpus may evolve and change. In yet some other situations, a same template image in the training data corpus may correspond to multiple metadata categories (e.g., the same invoice template image corresponds to multiple different vendor names or IDs). In these various situations, the image-based metadata identification modeling 236 of FIG. 2 may not be able of unequivocally identifying a single correct metadata category for the input region of interest with reasonable accuracy. Thus, metadata identification of those regions of interest and the corresponding input electronic documents may be further supplemented by the fussy text matching process 240 of FIG. 2.

In one implementation, the fuzzy text matching process 240 includes a metadata database 244 in communication with a fuzzy text matching model 242. The metadata database 244 may contain metadata corresponding to electronic documents that were missing or otherwise not included in the training data corpus for the image-based metadata identification model 238 developed for the image-based metadata identification process 230. For example, there may be a complete list of past, current, and future vendors. Metadata for these vendors, such as vendor names and IDs, may be maintained in the metadata database 244. Actual invoices may only existed for a subset of these vendors. Invoices from the rest of potential vendors may not have been previously received. The training and testing corpus for the image-based metadata identification model 238 above may correspondingly only include invoice documents or images of a subset of potential vendors. When an input electronic document contain an invoice issued by one of these potential vendors, the image-based metadata identification model 238 may not be able to accurately determine metadata category for these input documents.

In these situations, because textual metadata for these potential vendors may be available in the metadata database 244 and such information may be used by the fuzzy text matching process 240 to provide a better metadata identification for input electronic documents associated with these potential vendors. In particular, the fuzzy matching process 240 may involve identifying metadata entries in the metadata database 244 that approximately matches the textual information contained in an input electronic document. The final metadata identification for these electronic documents may be determined considering both the probabilities provided by the image-based metadata identification process 230 and the recommendation by the fuzzy text matching process 240 (260).

The textual metadata information in the metadata database 244 may be extracted from various sources. These sources may be text based. Alternatively, these sources may be image based. For example, images of documents related to vendors other than invoices may be available and these images may be converted via, e.g., an OCR process, to textual information and metadata may be further extracted from the converted textual information and maintained by the metadata database 244.

Figure 3:
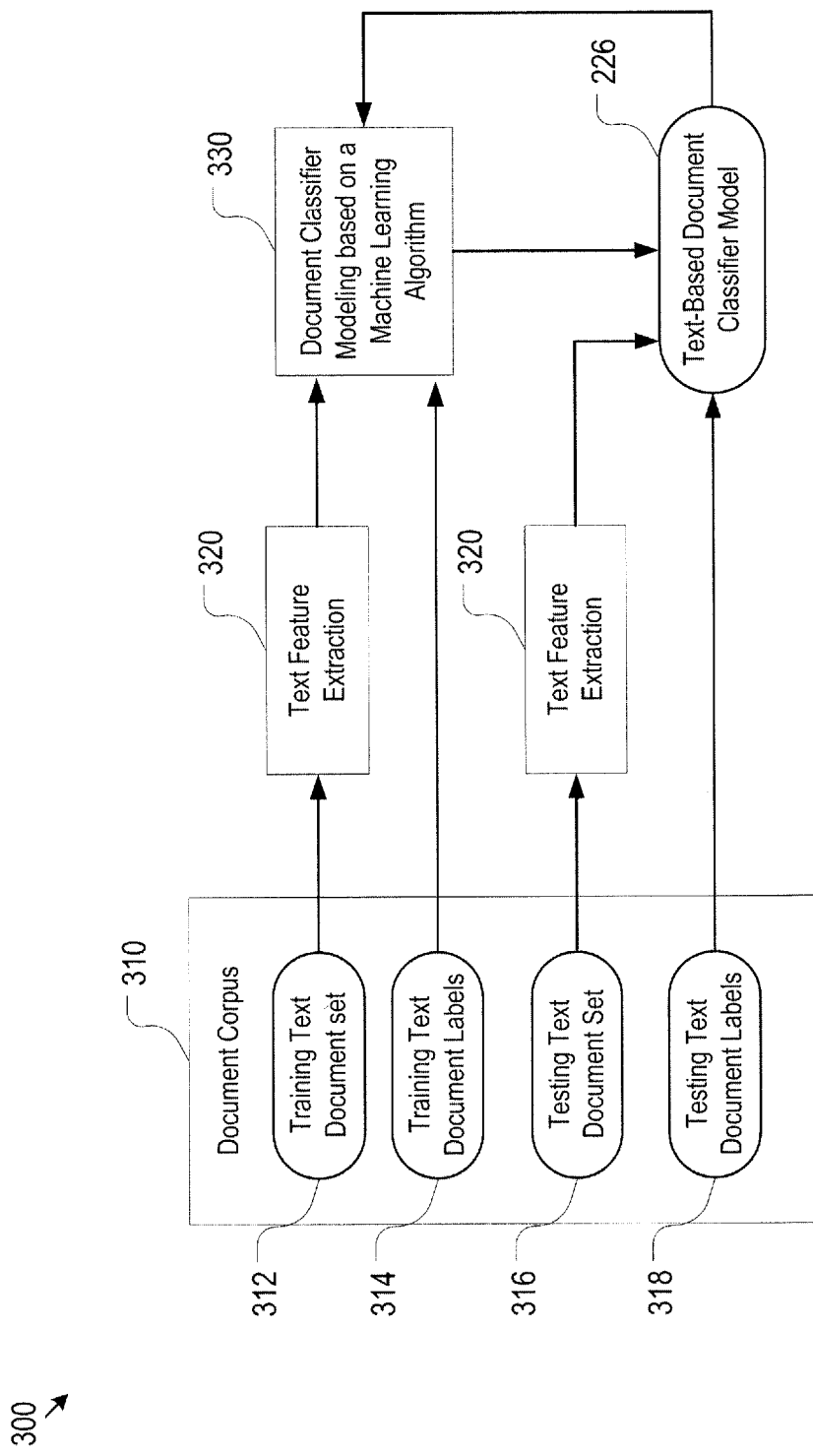
FIG. 3 illustrates a logic and data flow for establishing an exemplary text-based document classifier model that may be implemented as part of a process for hierarchical classification and metadata recognition/identification of electronic documents.

FIG. 3 illustrates a logic and data flow 300 for establishing an exemplary document classifier model 226 that may be used in the text-based document classification process 220 of FIG. 2. The development of the document classifier model may involve building a corpus of text documents or a document corpus 310 labeled with a predefined set of document categories. The development of the document classifier model 226 may further include text feature extraction process 320 and iterative document classifier modeling 330 based on a machine learning algorithm.

The document corpus 310 labeled with the predefined set of document categories may be divided into a training text document set 312 with labels 314 and testing text document set 316 with labels 318. The predefined set of document categories may be determined based on the scope of the electronic document collection. For example, the electronic documents may relate to vendor communications and may include vendor invoices, vendor proposals, product catalogues, product manuals, warranties, supply contracts, and the like. The electronic documents thus may be accordingly labeled with these exemplary categories. The electronic documents in the corpus 310 may be labeled manually, or alternatively, may be labeled using automated processes.

A multi-dimensional feature space may be defined to represent the electronic documents in the document corpus 310. The multi-dimensional feature space may be formed by a set of text features and these features may be further extracted from each document among the training document set 312 to represent the document in the multi-dimensional feature space (320). Each document in the training text document set 312 may be represented by a vector in the multi-dimensional feature space corresponding to a point in the multi-dimensional feature space having coordinates determined by the extracted features. A machine learning algorithm in the document classifier modeling process 330 is then responsible for determining rules and parameters that may be used to cluster or compartmentize the multi-dimensional feature space such that points representing the documents in the training text document set in the multi-dimensional feature space with a same document label approximately fall in a same one compartment according to an evaluation function of the machine learning algorithm. The compartmentized multi-dimensional feature space and the corresponding parameters form the basis of the text-based document classification model 226.

The dimensions of the text feature space may be predefined. For example, the text feature space may be determined using bag of words. Other implementations for constructing the multi-dimensional text feature space may include conceptual feature space, contextual feature space based on N-grams, mechanically extracted feature space, and document structural feature space. The number of dimensions of the multi-dimensional feature space may be limited for computational proficiency. For example, a scoring function may be used to rank the feature dimensions and only a predetermined number of top feature dimensions are used to form the multi-dimensional feature space for the text-based document classifier model 226. In one implementation, text features may be a group of words or phrases and the ranking of these features may be determined by how often these words or phrases appear in the document corpus 310.

The document classifier modeling 330 may be based on various machine learning algorithms, including various classification algorithms and regression algorithms. These classification and regression algorithms, for example, may be based on random forest regression, linear regression, logistic regression, naive Bayes classifier, Bayesian network, ordinary least squares regression, principal component regression, and the like. An evaluation function having multiple modeling parameters may be designed for clustering and compartmentize the multi-dimensional feature space such that points representing the documents in the training text document set in the feature space with a same document label approximately fall in a same one compartment. The modeling parameters form the basis of the text-based document classifier model 226. The established classification model may be further tested and improved upon using the testing text document set 316 in the document corpus 310. In particular, features of documents in the testing text document set 316 may be similarly extracted (320) and input into the text-based document classifier model 226 and classified according to the modeling parameters. The resulting classification may be compared with the testing text document labels 318. The document classifier modeling 330 may be iteratively applied to refine the modeling parameters such that the resulting document classifier model 226 achieves a predetermined level of accuracy in classifying the testing text document set 316. The final text-based document classifier model may be used in the text-based document classification process 220 of FIG. 2. The text feature calculation 225 of FIG. 2 correspondingly follow the same feature extraction process 320 of FIG. 3.

Figure 4:
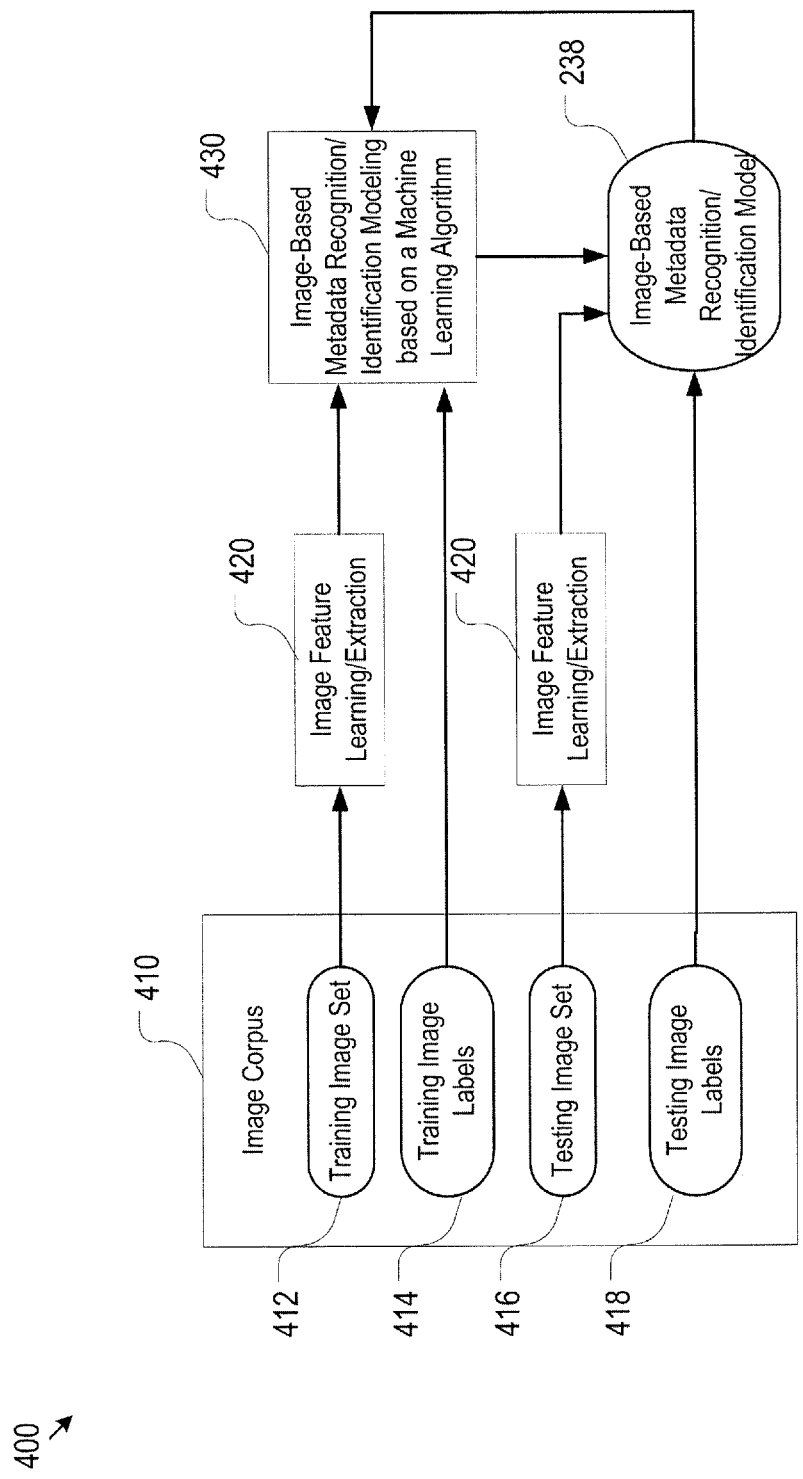
FIG. 4 illustrates a logic and data flow for establishing an exemplary image-based metadata recognition/identification model that may be implemented as part of a process for hierarchical classification and metadata recognition/identification of electronic documents.

FIG. 4 illustrates a logic and data flow 400 for establishing an exemplary image-based metadata identification model 238 that may be used in the image-based metadata identification process 230 of FIG. 2. The image-based metadata identification model 238 may be an image classifier for classifying an input image into a predetermined set of metadata categories (e.g., vendor names or IDs). The development of the image-based metadata identification model may involve building a corpus of images 410 (e.g., images of regions of interest of FIG. 2) labeled with the predefined set of metadata categories. In one implementation, the development of the image-based metadata identification model 238 may further include image feature extraction or learning (320) and iterative image-based metadata identification modeling 430 based on a machine learning algorithm.

The image corpus 410 labeled with the predefined set of metadata categories may be divided into a training image set 412 with labels 414 and testing image set 416 with labels 418. The predefined set of metadata categories may be determined based on the scope of the images in the image corpus 410. For example, the images in the image corpus 410 may relate to invoices from various vendors. The metadata categories may correspond to vendor names or IDs. The images in the image corpus 410 thus may be accordingly labeled with these vendor names or IDs. The images in the corpus may be labeled manually, or alternatively, may be labeled using automated processes.

In the implementation of FIG. 4, image feature extraction 420 and image-based metadata identification modeling 430 based on machine learning algorithms may be separate processes. In particular, a multi-dimensional image feature space may be determined or learned to represent the images in the image corpus 410. The multi-dimensional image features space may be formed by a set of image features and these image features may be learned and extracted from each image among the images in the training image set 412 to represent the image in the multi-dimensional image feature space (420). Each image of the images in the training image set may be represented by a vector in the multi-dimensional image feature space corresponding to a point in the multi-dimensional image feature space having coordinates determined by the extracted image features. The machine learning algorithm in the image-based metadata identification modeling process 430 is then responsible for determining model rules and parameters that may be used as a basis for the image-based metadata identification model 238 using the metadata category labels 414 for the training images 412. The model rules and parameters may be further improved upon using the testing image set 416 and testing image labels 418. The final image-based metadata identification model 238 may then be used to find probabilities of an input image being any one of the predetermined set of metadata categories.

Alternatively, the image-based metadata identification modeling may be implemented based on multi-layer deep learning technologies, including but not limited to convolutional neural network (CNN). As such, the image feature extraction 237 and image-based metadata identification model 238 may be integrally implemented as a multi-layer CNN, as illustrates in the exemplary logic and data flow 500 of FIG. 5.

Figure 5:
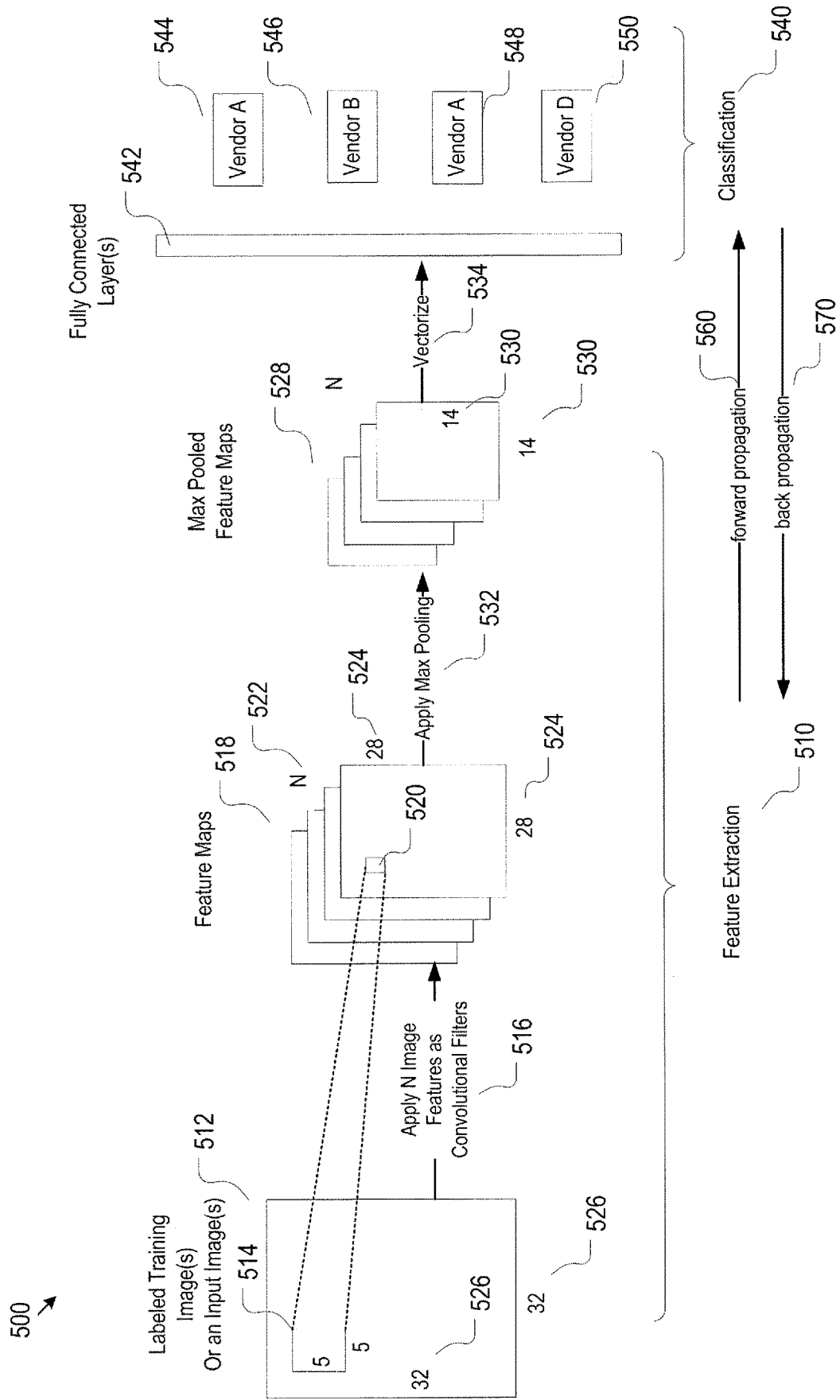
FIG. 5 illustrates an image-based metadata recognition/identification modeling process implemented based on convolutional neural network technology.

The exemplary CNN based metadata identification modeling logic and data flow 500 may includes image feature extraction layers 510 and classification layers 540 for iterative learning of image features and the classification model (560 and 570) using labeled training images 512. In particular, a training image 512 is convolutionally filtered using N image features (each in the form of an image patch 514), as shown by 516, to obtain N feature maps 518. Each of the N image features are randomly initialized. In the example of FIG. 5, the training image is normalized to a predetermined size, 32 by 32, for example (as shown by 526*s*). The size of the image patch for each image feature may be predetermined (e.g., 5 by 5, as shown by 514*s*). The 32 by 32 training image 512, following the convolution filtering 516, becomes N feature maps 518 of 28 by 28 (as shown by 524*s*). The number of feature maps N (522) corresponds to the number of image features 514. Each point in the feature maps 518, e.g., point 520, corresponds to a convolution of one of the image features 514 and a 5 by 5 patch of the training image 512. The size of the feature maps 518 is 28 by 28 in this example because the a 5 by 5 feature 514, when moving across the entire 32 by 32 training image, produces 28 by 28 unique positions. The feature maps 518 may then be max pooled to reduce their sizes (532) to obtain max pooled feature maps 528. The max pooling, for example, may divide each feature map into groups of a predetermined number, e.g., 2 by 2, of neighboring points and only keep the maximum points in the group. As such, the max pooled feature maps 528 in the example of FIG. 5 includes N of 14 by 14 feature maps (as shown by 530*s*). Process 516 and 532 may be repeated in multiple convolutions and max pooling layers using higher-level image features. The resulting final max pooled feature maps may be vectored in 534 to obtain a fully connected layer 542. In some alternative, the fully connect layer may be implemented as multiple layers. The fully connected layer(s) 542 may then be correlated with the class label of the training image, e.g., vendor A 544, vendor B 546, vendor C 548, or vendor D 550.

The process above represents a forward propagation 560. The initially random image features 514 may be refined to minimize any error in classifying the training image 512 into its correct label via back propagation process 570. The forward propagation process 560 and back propagation process 570 are iteratively performed for a large number training images to obtain common image features that provide optimal classification that is consistent with the labels of the training images. Finally, an input image may be processed through the forward propagation 560 to obtain predicted probability of the input image being associated with any of vendors A, B, C, or D. The CNN based image classification process 500 thus may be used to implement the image-based metadata identification modeling 236 of FIG. 2.

Figure 6:
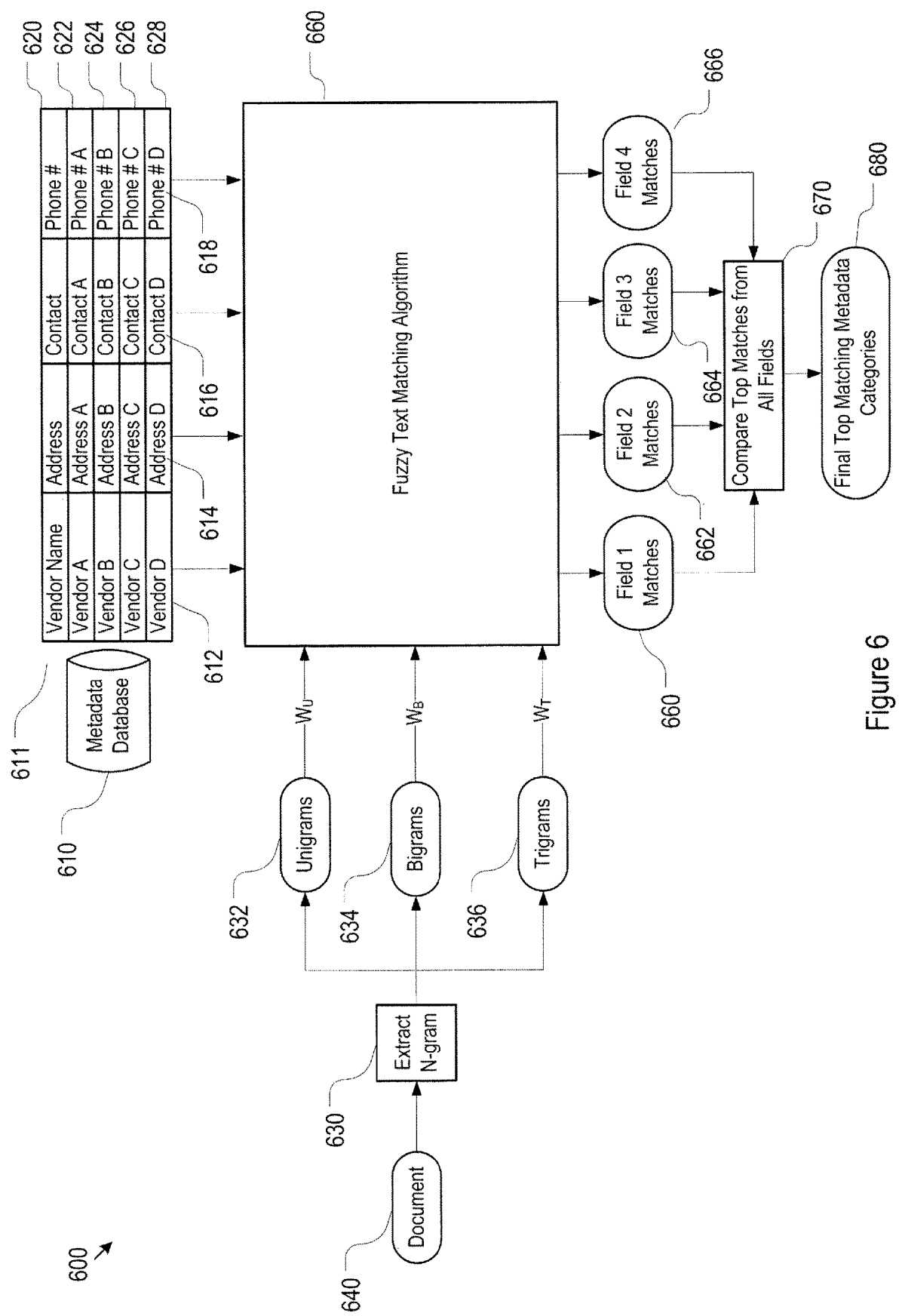
FIG. 6 illustrates a logic and data flow for establishing an exemplary fuzzy text matcher that may be implemented as part of a process for hierarchical classification and metadata recognition/identification of electronic documents.

FIG. 6 illustrates an exemplary logic and data flow 600 that may be used as the fuzzy text matching process 240 of FIG. 2. The exemplary fuzzy text matching process includes extracting N-grams 632, 624, and 636 from an input textual document 640 (630), accessing the metadata database 510 having multiple metadata data items 611, and running a fuzzy text matching algorithm 650 on the extracted N-grams and metadata data items to obtain top metadata data items matching the extracted N-grams.

N-grams of an input electronic document are essentially terms of predefined length in the input electronic documents. The terms may contain a single word (unigrams), two words (bigrams), three words (trigrams), or more. Trigrams of a document, for example, may include all three consecutive word patterns appearing in the document. Using terms of multiple consecutive words to characterize the input documents may help reducing false positives in the fuzzy text matching process 600 and thus supplement and improve rather than degrade the accuracy of the image-based metadata identification process 240 of FIG. 2. For example, the word "Dell" may point to Vendor Dell, Inc., but could also appear in an electronic document as a product name rather than a vendor name related to metadata categories. Although the illustration of FIG. 6 only shows extraction of unigrams, bigrams, and trigrams from the input electronic document 640, higher level N-grams may be similarly extracted. The number of levels of N-grams to be included in the fuzzy matching process of FIG. 6 may be determined by considering a tradeoff between computational requirement and gain in modeling accuracy.

The metadata database 610 may contain metadata data items represented by the table 611. The metadata data items may be logically arranged in rows and columns. In one example, the rows 620, 622, 624, 626, and 628 may represent metadata for different vendors. The columns 612, 614, 616, and 618 may represent different types of metadata. The data columns of 611 may be alternatively referred to as metadata fields. One of the columns or fields, e.g., metadata field 612, may represent the predefined metadata categories. As such, the input electronic documents of FIG. 2 are to be labeled with one of the metadata data items of the metadata field 612, e.g., Vendor A, Vendor B, Vendor C, and Vendor D. Other metadata fields, for example, may include vendor address field 614, vendor contact field 616, and vendor phone number field 618.

The N-grams 632, 634, and 636 as extracted from the input document 640, as well as the metadata data items 611 may be input into the fuzzy text matching algorithm 650. In one implementation, fuzzy matching between the N-grams and the metadata data items may be conducted for each metadata column or field. A predetermined number of best matching metadata data items of each metadata field may be determined, as shown by 660, 662, 664, and 666. For example, top 20 matches in each metadata field may be identified.

The fuzzy matching may be performed between each metadata data item with all extract N-grams 632, 634, and 636 of the input document. The matching may be weighted, e.g., different weights are given to unigrams, bigrams, and trigrams. For example, higher weight may be given to the trigrams than the bigrams and the unigrams, and higher weight may be given to the bigrams than the unigrams because higher level N-grams may carry more syntactic information.

The top matches from each metadata field may be further compared to extract a predetermined number of final matches (670). Different fields may be given different weights in this comparison process. For example, more weight may be given to address field 614 than phone number field 618. In one exemplary implementation, final top three metadata items may be determined. The corresponding data items 670 in the metadata category field 612 may further be identified as the final top matching metadata categories 680. In some implementation, preferable weight may be given to a metadata row having multiple top matching data items. Such preferential weight may be given because multiple matching data items within the same row indicates that the input document contains more detailed description of the entity associated with this row of the metadata database and thus the document may be preferably labeled with such entity (or metadata category).

The implementations disclosed above provide improvements of computing technology. For example, text data in an electronic document may be processed in character string data type and representation. The implementations disclosed herein involve transforming a document patch with embedded text into a data matrix representing a bit map image of the document patch, and thus provide a data structure that is more efficiently processed using hardware-accelerated matrix manipulation. The data matrix further contains information beyond the string content of the embedded text that may be recognized via machine learning of data patterns in the matrix data structure.

The exemplary implementations above facilitates automatic document processing, identification, and organization, e.g., invoice processing and vendor identification. Similar approaches may be used in, for example, delivery tracking (e.g., by courier/logistics service providers) to classify documents as "delivered note" and to extract vendor metadata from delivered notes. As another example, the implementations above may be used in insurance claim processing to classify claim documents into different types of claims, such as motor vehicle insurance claims, medical insurance claims, and the like, and extract/identify, e.g., claimant metadata from only the medical claims (e.g., hospital, clinic, and doctor metadata information) or manufacturer metadata information from only the motor vehicle insurance claims.

The principal of using imaging classification for identifying metadata and using fuzzy text matching for achieving better accuracy or as supplement when training images for the image classification model were incomplete may be broadly applied in industrial and manufacturing settings. For example, recognition of manufacturers of electronic components in an electronics assembly plant may rely on image recognition of logo for a set of electronic manufacturers. Such image-based recognition may be further supplemented by extracting text from the image of the electronic components and fuzzy matching the extracted text with a metadata database of electronic manufacturers that may be more comprehensive than the training image database for the image based classification model. As such, a manufacturer of electronic components having a logo that were not part of the training images (e.g., a manufacturer has changed to a new logo) may still be identified with reasonable accuracy via the supplemental fuzzy text matching process.

While the disclosure above uses text-based document classification and image-based metadata identification as examples, the principle of cascading multiple classification or regression models for simplifying a classification problem and reducing computational intensity may be broadly applied to other scenarios where large and diverse feature set and feature space are involved.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
   a database comprising metadata data elements organized in metadata fields, where the metadata fields include at least a metadata category field containing metadata category data elements belonging to a predetermined set of metadata categories;
   a memory for storing a text-based document classifier model established based on a machine learning algorithm, an image-based metadata category identification model; and a fuzzy text matcher; and
   system circuitry in communication with the database and the memory, the system circuitry configured to:
      receive an electronic document;
      generate a text document containing extractable text from the electronic document and an image representing a page view of the electronic document;
      determine that the electronic document belongs to a predetermined set of document categories by using the text-based document classifier model to process the text document;
      in response to determining that the electronic document belongs to the predetermined set of document categories:
         obtain a first association of the image with a first metadata category data element of the metadata category field using the image-based metadata category identification model, wherein the image-based metadata category identification model is pretrained using a training corpus of images labeled using a subset of metadata categories of the predetermined set of metadata;
         obtain a second association of the electronic document with a subset of the metadata data elements of the database by using the fuzzy text matcher to approximately match segments of the text document with the subset of the metadata data elements;
         identify a subset of the metadata category data elements corresponding to the subset of the metadata data elements in the database;
         select a single metadata category data element among a combination of the first metadata category data element and the subset of the metadata category data elements based on an identification probability for the first association and fuzzy matching probabilities for the second association; and
         attach the selected single metadata category data element as a metadata category label to the electronic document.

2. The system of claim 1, where the system circuitry is configured to determine that the electronic document belongs to the predetermined set of document categories by:
   inputting the text document into the text-based document classifier model to obtain a classification; and
   determining that the classification is among the predetermined set of document categories.

3. The system of claim 1:
where the system circuitry is further configured to obtain a region of interest from the image of the electronic document; and
where the system circuitry is configured to obtain the first association by applying the image-based metadata category identification model to the region of interest.

4. The system of claim 3, wherein the region of interest comprises part of the image.

5. The system of claim 3, where the system circuitry is configured to obtain the region of interest from the image corresponding to the electronic document by:
determining a location and size of the region of interest relative to the image; and
cropping and/or reshaping and/or realigning the image according to the location and size of the region of interest to obtain the region of interest from the image.

6. The system of claim 3, where the system circuitry is configured to obtain the region of interest from the image corresponding to the electronic document by:
determining a location and size of the region of interest relative to the image;
cropping the image according to the location and size of the region of interest to obtain a cropped image; and
preprocessing the cropped image to obtain the region of interest.

7. The system of claim 6, where the region of interest comprises an array of pixels and where preprocessing the cropped image comprises at least one of reduction in pixel resolution and skew correction.

8. The system of claim 1, where the system circuitry is configured to obtain the second association of the electronic document with the subset of the metadata data elements of the database using the fuzzy text matcher by:
extracting a set of n-grams of a text contained in the electronic document to represent the electronic document; and
performing fuzzy matching between the set of n-grams with the metadata data elements of the database to identify the subset of the metadata data elements of the database matched with the set of n-grams and to obtain the second association.

9. The system of claim 8, where performing fuzzy matching comprises:
performing fuzzy matching between the set of n-grams with the metadata data elements of the database to identify a predetermined number of top matched metadata data elements within each of the metadata fields to obtain a collection of metadata data elements most matched with the set of n-grams of the electronic document and to obtain corresponding associations; and
identifying the subset of the metadata data elements by weighted comparison of corresponding associations of the collection of metadata data elements most matched with the set of n-grams.

10. The system of claim 8, where the set of n-grams comprises a set of unigrams, a set of bigrams, and a set of trigrams.

11. The system of claim 10, where performing fuzzy matching between the set of n-grams with a data item of the database comprises placing different weight on the set of unigrams, the set of bigrams, and the set of trigrams.

12. The system of claim 11, where the set of trigrams is given a higher weight than the set of bigrams and the set of bigrams is given higher weight than the set of unigrams.

13. A method comprising:
receiving an electronic document by a system having a memory and system circuitry;
generating a text document containing extractable text from the electronic document using a text-based document classifier model established based on a machine learning algorithm and stored in the memory and generating an image representing a page view of the electronic document;
determining that the electronic document belongs to a predetermined set of document categories by using the text-based document classifier model to process the text document;
in response to determining that the electronic document belongs to the predetermined set of document categories:
obtaining a first association of the image with a first metadata category among a subset of metadata categories of a predetermined set of metadata categories using an image-based metadata category identification model stored in the memory, where the predetermined set of metadata categories are stored as data elements in a metadata category field in a database of the system containing metadata data elements organized in metadata fields including the metadata category field, and wherein the image-based metadata category identification model is pretrained using a training corpus of images labeled using the subset of metadata categories;
obtaining a second association of the electronic document with a subset of the metadata data elements of the database by using a fuzzy text matcher stored in the memory to approximately match segments of the text document with the subset of the metadata data elements;
identifying a subset of the predetermined set of metadata categories corresponding to the subset of the metadata data elements in the database;
selecting a single metadata category among a combination of the first metadata category and the subset of the predetermined set of metadata categories corresponding to the subset of the metadata data elements of the database as a label for the electronic document based on an identification probability for the first association and fuzzy matching probabilities for the second association; and
attaching the selected single metadata category data element as a metadata category label to the electronic document.

14. The method of claim 13, where determining that the electronic document belongs to the predetermined set of document categories by:
inputting the text document into the text-based document classifier model to obtain a classification; and
determining that the classification is among the predetermined set of document categories.

15. The method of claim 13, further configured to obtaining a region of interest from the image of the electronic document, and where obtaining the first association comprises applying the image-based metadata category identification model to the region of interest.

16. The method of claim 15, wherein the region of interest comprises part of the image.

17. The method of claim 15, where obtaining the region of interest from the image corresponding to the electronic document comprises:
determining a location and size of the region of interest relative to the image; and cropping and/or reshaping and/or realigning the image according to the location and size of the region of interest to obtain the region of interest from the image.

18. The method of claim 15, where obtaining the region of interest from the image corresponding to the electronic document comprises:
   determining a location and size of the region of interest relative to the image;
   cropping the image according to the location and size of the region of interest to obtain a cropped image; and
   preprocessing the cropped image to obtain the region of interest.

19. The method of claim 13, where obtaining the second association of the electronic document with the subset of the metadata data elements of the database comprises:
   extracting a set of n-grams of a text contained in the electronic document to represent the electronic document; and
   performing fuzzy matching between the set of n-grams with the metadata data elements of the database to identify the subset of the metadata data elements of the database matched with the set of n-grams and to obtain the second association.

20. The method of claim 19, where performing fuzzy matching comprises:
   performing fuzzy matching between the set of n-grams with the metadata data elements of the database to identify a predetermined number of top matched metadata data elements within each of the metadata fields to obtain a collection of metadata data elements most matched with the set of n-grams of the electronic document and to obtain corresponding associations; and
   identifying the subset of the metadata data elements by weighted comparison of corresponding associations of the collection of metadata data elements most matched with the set of n-grams.

* * * * *